United States Patent
Rotole et al.

(10) Patent No.: US 11,518,434 B2
(45) Date of Patent: Dec. 6, 2022

(54) STEERING AUTHORITY CONTROL FOR A VEHICLE

(71) Applicant: DEERE & COMPANY, Moline, IL (US)

(72) Inventors: David V. Rotole, Bloomfield, IA (US); Bronson C. Eick, Ottumwa, IA (US)

(73) Assignee: DEERE & COMPANY, Moline, IL (US)

(*) Notice: Subject to any disclaimer, the term of this patent is extended or adjusted under 35 U.S.C. 154(b) by 531 days.

(21) Appl. No.: 16/670,419

(22) Filed: Oct. 31, 2019

(65) Prior Publication Data
US 2021/0129903 A1    May 6, 2021

(51) Int. Cl.
| | |
|---|---|
| *B62D 6/00* | (2006.01) |
| *B62D 11/02* | (2006.01) |
| *B60K 17/10* | (2006.01) |
| *B62D 5/06* | (2006.01) |
| *B62D 11/00* | (2006.01) |
| *A01B 69/04* | (2006.01) |
| *A01B 69/00* | (2006.01) |

(52) U.S. Cl.
CPC ............... *B62D 6/00* (2013.01); *B60K 17/10* (2013.01); *B62D 5/06* (2013.01); *B62D 11/005* (2013.01); *B62D 11/02* (2013.01); *A01B 69/007* (2013.01); *A01B 69/008* (2013.01)

(58) Field of Classification Search
CPC .......... B62D 6/00; B62D 5/06; B62D 11/005; B62D 11/02; B62D 11/24; B60K 17/10; B60K 17/356; A01B 69/007; A01B 69/008; B60Y 2200/222
See application file for complete search history.

(56) References Cited

U.S. PATENT DOCUMENTS

| | | | |
|---|---|---|---|
| 4,313,514 A | 2/1982 | Furukawa et al. | |
| 4,610,455 A | 9/1986 | Furukawa et al. | |
| 5,080,185 A | 1/1992 | Kondo et al. | |
| 5,489,005 A * | 2/1996 | Marcott | B62D 12/00 |
| | | | 180/405 |
| 5,758,740 A | 6/1998 | Park | |
| 8,496,256 B2 | 7/2013 | Bebernes et al. | |
| 8,925,672 B2 | 1/2015 | Bebernes et al. | |
| 9,227,660 B1 | 1/2016 | Bebernes et al. | |

(Continued)

FOREIGN PATENT DOCUMENTS

AU    2013237700 B2    6/2016

*Primary Examiner* — Tony H Winner
*Assistant Examiner* — Marlon A Arce

(57) ABSTRACT

A vehicle includes a rear steering system and a front differential hydraulic drive system. A first front drive control valve is operable to output a defined fluid flow in response to a steering command input. A second front drive control valve is operable to selectively divert a portion of the defined fluid flow output from the first front drive control valve. When the vehicle is operating in a pre-defined condition, a steering controller may control the second front drive control valve to divert a portion of the defined fluid flow from the first front drive control valve to define a reduced fluid flow, which is communicated to the front differential hydraulic drive system, to reduce a steering ratio of the front differential hydraulic drive system relative to the rear steering system, to desensitize steering provided by the front differential hydraulic drive system.

20 Claims, 2 Drawing Sheets

(56) References Cited

U.S. PATENT DOCUMENTS

| | | | |
|---|---|---|---|
| 9,370,138 B2 | 6/2016 | Bebernes et al. | |
| 9,380,737 B2 | 7/2016 | Bebernes et al. | |
| 9,421,999 B2 | 8/2016 | Rotole et al. | |
| 9,439,341 B2 | 9/2016 | Bebernes et al. | |
| 10,207,735 B2 | 2/2019 | Bebernes et al. | |
| 10,633,015 B2 * | 4/2020 | Emmert | B62D 5/093 |
| 10,953,918 B2 * | 3/2021 | Graham | B60B 33/04 |
| 11,105,653 B2 * | 8/2021 | Schott | G06F 16/29 |
| 11,166,403 B2 * | 11/2021 | Dockter | A01F 15/08 |
| 2010/0212994 A1 * | 8/2010 | Nicklin | B62D 1/22 |
| | | | 180/422 |
| 2014/0138165 A1 | 5/2014 | Bebernes et al. | |
| 2017/0291636 A1 * | 10/2017 | Maniar | B62D 11/20 |
| 2018/0201310 A1 | 7/2018 | Rotole | |

\* cited by examiner

STEERING AUTHORITY CONTROL FOR A VEHICLE

FIELD OF THE DISCLOSURE

The present disclosure generally relates to vehicles having a front wheel differential hydraulic drive system and a rear wheel steering system.

BACKGROUND OF THE DISCLOSURE

In some vehicles, including but not limited to agricultural vehicles such as combines and windrowers, a forward set of wheels may be mounted in a fixed, forward facing orientation. In other words, the front wheels are not free to turn left or right about a respective vertical axis to turn the vehicle. In such a configuration, the vehicle may be steered by the front wheels by driving the front wheels at different rotational speeds from each other. The vehicle further includes a rear set of wheels. Often, the rear set of wheels are mounted on casters. In some embodiments, the rear set of wheels may be free to rotate about respective vertical axes, and do not contribute to steering of the vehicle. Optionally, in other embodiments, the rear set of wheels may be steerable to assist in steering operations of the vehicle.

Steering of such vehicles may be achieved either manually, in which an operator provides a steering command input, or autonomously, in which a steering controller, e.g., a computer, controls the steering systems of the vehicle to follow a defined path, direction, route, etc. When operating vehicles in which the primary steering authority is provided by the differential rotational speed of the front wheels in a manual operation mode and at higher ground speeds, a steering response to a steering command input by the operator may make manual operation of the vehicle at higher ground speeds challenging.

SUMMARY OF THE DISCLOSURE

According to an aspect of the present disclosure, a vehicle is provided. The vehicle includes a steering control system that is operable to receive a steering command input from an operator. A rear steering system has at least one rear wheel, e.g., a rear left wheel and a rear right wheel. Each rear wheel is rotatable about respective vertical axis a predetermined angle to turn the vehicle in response to the steering command input from the operator. A front differential hydraulic drive system is operable to drive a front left wheel at a first rotational speed and a front right wheel at a second rotational speed. The second rotational speed is different than the first rotational speed to turn the vehicle in response to the steering command input from the operator. The vehicle further includes a pump operable to circulate a hydraulic fluid, and a hydraulic drive fluid circuit interconnecting the pump and the front differential hydraulic drive system. A first front drive control valve is disposed in the hydraulic drive fluid circuit. The first front drive control valve is operable to output a defined fluid flow in response to the steering command input. A second front drive control valve is disposed in the hydraulic drive fluid circuit, between the first front drive control valve and the front differential hydraulic drive system. The second front drive control valve is operable to selectively divert a portion of the defined fluid flow output from the first front drive control valve. A steering controller includes a processor and a memory having a steering authority control algorithm stored thereon. When a current vehicle operating characteristic satisfies a pre-defined condition, the processor is operable to execute the steering authority control algorithm to control the second front drive control valve to divert a portion of the defined fluid flow output from the first front drive control valve to define a reduced fluid flow that is communicated to the front differential hydraulic drive system. By diverting a portion of the defined fluid flow that is output from the front drive control valve, the steering provided by the front differential hydraulic drive system for the steering command input by the operator is reduced, which reduces steering sensitivity and reduces a steering ratio of the front differential hydraulic drive system relative to the rear steering system for the steering command input is reduced. By reducing the steering ratio of the front differential hydraulic drive system relative to the rear steering system, the rear steering system may provide more of the vehicle steering, which improves vehicle stability when operating in the pre-defined condition.

In one aspect of the disclosure, the steering control system includes a steering input device that is operable to receive the steering command input. The steering input device may include, for example, a steering wheel, levers, etc. In one embodiment, the steering input device may be mechanically coupled to the first front drive control valve to provide a manually controlled steering valve. In another embodiment, the steering input device may be electronically coupled to the first front drive control valve to provide a drive-by-wire steering system.

In one aspect of the disclosure, a steering sensor is coupled to the steering input device. The steering sensor is operable to detect the steering command input and output a sensor signal indicative of the steering command input. The steering controller is in communication with the steering sensor for receiving the sensor signal. The steering controller is operable to communicate a rear steering control signal to the rear steering system, based on the sensor signal, for controlling rotation of the at least one rear wheel, e.g., the rear left wheel and the rear right wheel about their respective vertical axes the predetermined angle.

In one aspect of the disclosure, the front differential hydraulic drive system includes a left-side motor and a right-side motor. The left-side motor is coupled to the front left wheel, and the right-side motor is coupled to the front right wheel. The defined fluid flow that is output form the first front drive control valve includes a left-side component and a right-side component. The left-side component is in fluid communication with the left-side motor for driving the left-side motor. The right-side component is in fluid communication with the left-side motor for driving the left-side motor. The second front drive control valve is operable to divert a substantially equal amount of fluid from each of the left-side component and the right-side component of the defined fluid flow.

In one aspect of the disclosure, the hydraulic drive fluid circuit includes a tank in fluid communication with the second front drive control valve. The tank is in fluid communication with and supplies hydraulic fluid to the pump. The pump circulates the hydraulic fluid through the hydraulic drive fluid circuit, as well as other fluid circuits, and back to the tank. In one aspect of the disclosure, the second front drive control valve is selectively controllable to divert a portion of the defined fluid flow to the tank. The processor is operable to execute the steering authority control algorithm to control an amount of fluid diverted by the second front drive control valve based on a magnitude of the current vehicle operating characteristic, such that as the magnitude of the current vehicle operating characteristic increases, the amount of fluid diverted by the second front drive control valve increases. For example, the current vehicle operating characteristic may include a speed of the vehicle, such that the amount of fluid diverted by the second front drive control valve is based on a magnitude of the speed of the vehicle. As such, as the speed of the vehicle increases, the amount of fluid diverted by the second front drive control valve may also increase.

In one embodiment of the disclosure, the first front drive control valve is a manual steering control valve for enabling manual steering of the vehicle by the operator, and the second front drive control valve is an autonomous steering control valve controlled by the steering controller for enabling autonomous steering of the vehicle without operator input.

In one aspect of the disclosure, the processor is operable to execute the steering authority control algorithm to determine if the current vehicle operating characteristic satisfies the pre-defined condition, or if the current vehicle operating characteristic does not satisfy the pre-defined condition. In one embodiment of the disclosure, the current vehicle operating characteristic includes one of either automatic steering control of the vehicle by the steering controller, or manual steering control of the vehicle by an operator. The pre-defined condition includes and is satisfied when the vehicle is actively using manual steering control of the vehicle by the operator.

In another aspect of the disclosure, the vehicle includes a speed sensor operable to sense a speed of the vehicle and communicate the sensed speed to the steering controller. In one embodiment of the disclosure, the current vehicle operating characteristic is a current speed of the vehicle, and the pre-defined condition is the current speed of the vehicle being equal to or greater than a minimum pre-defined speed. The processor is operable to execute the steering authority control algorithm to determine if the current speed of the vehicle is less than the minimum pre-defined speed, or if the current speed of the vehicle is equal to or greater than the minimum pre-defined speed.

In one embodiment of the disclosure, the rear steering system is a hydraulically controlled steering system. The rear steering system includes at least one rear steering control valve and at least one hydraulic cylinder. The rear steering control valve is disposed in fluid communication with the pump for receiving hydraulic fluid therefrom. The rear steering control valve is also in fluid communication with the rear hydraulic cylinder. The rear steering control valve is operable to output a rear fluid flow in response to the rear steering control signal from the steering controller. The rear fluid flow is communicated to the rear hydraulic cylinder to actuate the rear hydraulic cylinder, which in turn rotates the at least one rear wheel, e.g., the rear left wheel and the rear right wheel about their respective vertical axis.

The above and other features will become apparent from the following description and accompanying drawings.

BRIEF DESCRIPTION OF THE DRAWINGS

The detailed description of the drawings refers to the accompanying figures in which.

DETAILED DESCRIPTION OF THE DRAWINGS

Those having ordinary skill in the art will recognize that terms such as "above," "below," "upward," "downward," "top," "bottom," etc., are used descriptively for the figures, and do not represent limitations on the scope of the disclosure, as defined by the appended claims.

Figure 1:
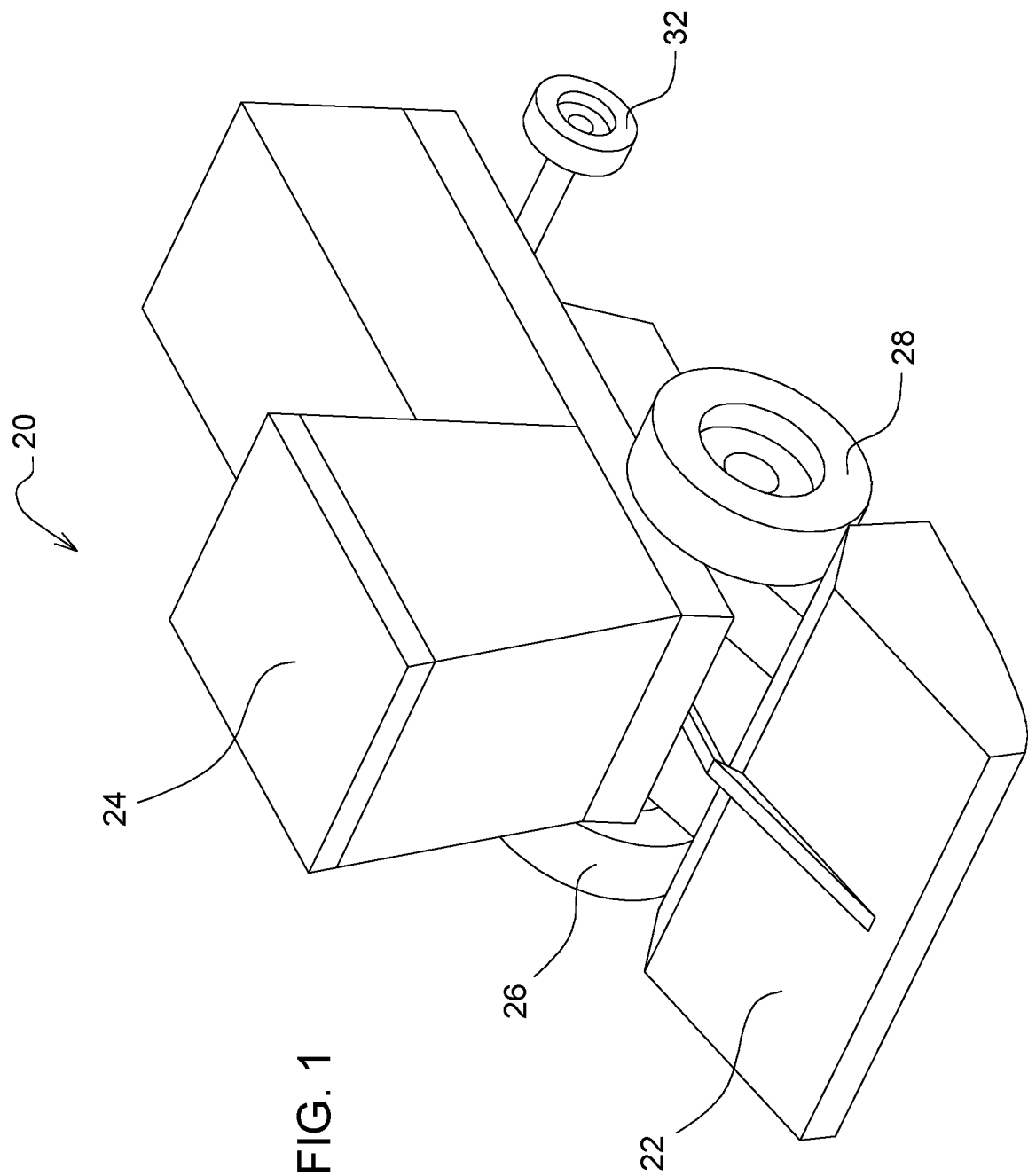
FIG. 1 is a schematic perspective view of a vehicle.

Referring to the Figures, wherein like numerals indicate corresponding parts throughout the several views, an exemplary embodiment of a vehicle is generally shown at 20 in FIG. 1. The vehicle 20 is shown as a windrower. However, it should be appreciated that the vehicle 20 may be configured differently, such as but not limited to a combine, lawn mower, or some other movable platform. The exemplary embodiment of the vehicle 20 includes a header 22 for cutting and gathering crop material into a windrow. Additionally, it should be appreciated that the different components and systems of the vehicle 20 described below may differ from the exemplary embodiment of the vehicle 20 shown in the Figures and described herein.

Referring to FIG. 1, the vehicle 20 includes a frame, on which is supported a cab 24. The cab 24 includes an operator's station, from which an operator may control the vehicle 20. The cab 24 includes the various controls, displays, input devices, etc., necessary for the operator to control the vehicle 20. The frame supports a front right wheel 26, a front left wheel 28, and at least one rear wheel. In the exemplary embodiment shown in the Figure and described herein, the at least one rear wheel includes a rear right wheel 30, and a rear left wheel 32. The front right wheel 26 and the front left wheel 28 are fixed in a forward-facing orientation, such that the front right wheel 26 and the front left wheel 28 do not pivot about a respective vertical axis. The rear right wheel 30 and the rear left wheel 32 are rotatably attached to the frame, such that the rear right wheel 30 and the rear left wheel 32 are rotatable about respective vertical axes.

Figure 2:
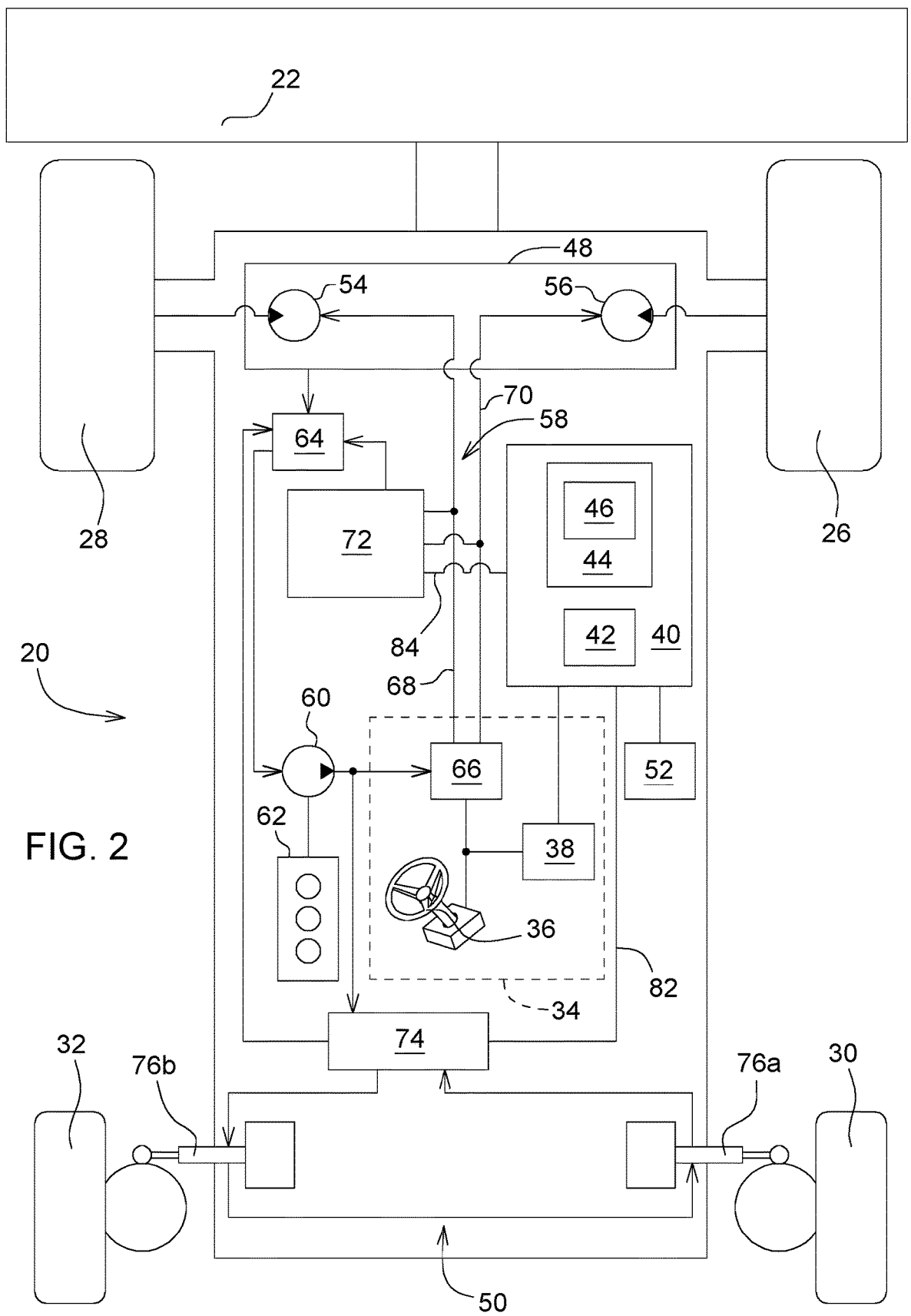
FIG. 2 is a schematic plan view of the vehicle.

Referring to FIG. 2, the vehicle 20 includes a steering control system 34 that is operable to receive a steering command input from an operator. The steering control system 34 includes a steering input device 36. The operator uses the steering input device 36 to enter the steering command input. The steering input device 36 may include, but is not limited to, a steering wheel, steering levers, a joystick, a touch screen, etc.

The steering control system 34 includes a steering sensor 38 that is coupled to the steering input device 36. The steering sensor 38 is operable to detect the steering command input of the steering input device 36, and output a sensor signal indicative of the steering command input. The sensor may include any type and/or configuration of sensor suitable for detecting the steering command input from the steering input device 36, and may be dependent upon the specific type of steering input device 36 used. The specific type and/or manner of operation of the steering sensor 38 are not pertinent to the teachings of this disclosure, are well known in the art, and are therefore not described in detail herein.

The vehicle 20 includes a steering controller 40. The steering controller 40 may alternatively be referred to as a controller, a module, a control module, a computer, etc. The steering controller 40 is configured to control the operation of the steering systems of the vehicle 20, i.e., a front differential hydraulic drive system 48 and a rear steering system 50. The steering controller 40 may be configured to control other components and/or systems as well. It should be appreciated that the steering controller 40 may include a single device, or multiple interconnected devices.

The steering controller 40 includes a processor 42 and a memory 44, and may further include all software, hardware, algorithms, connections, sensors, etc., necessary to manage and control the operation of the steering systems of the vehicle 20. As such, a method of controlling the steering systems of the vehicle 20 may be embodied as a program or algorithm that is operable on the steering controller 40. It should be appreciated that the steering controller 40 may include any device capable of analyzing data from various sensors, comparing data, making the necessary decisions required to control the operation of the steering systems of the vehicle 20, and executing the required tasks necessary to control the operation of the steering systems.

The steering controller 40 may be embodied as one or multiple digital computers or host machines each having one or more processors 42, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 44 may include any non-transitory/tangible medium which participates in providing data or computer-readable instructions. Memory 44 may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The steering controller 40 includes the tangible, non-transitory memory 44 on which are recorded computer-executable instructions, including a steering authority control algorithm 46. The processor 42 of the steering controller 40 is configured for executing the steering authority control algorithm 46 to implement a method of controlling the front differential hydraulic drive system 48 and the rear steering system 50, described in greater detail below.

The steering controller 40 is in communication with the steering sensor 38, and receives the sensor signal that indicates the steering command input from the steering input device 36. The steering controller 40 generates a rear steering control signal 82 based on the sensor signal for the steering command input. The rear steering control signal 82 controls steering provided by the rear left wheel 32 and the rear right wheel 30, described in greater detail below.

The vehicle 20 may further include a speed sensor 52 and/or other sensor systems. The speed sensor 52 is operable to sense a speed of the vehicle 20 and communicate the sensed speed to the steering controller 40. The speed sensor 52 may include any type and/or configuration of sensor capable of sensing and/or determining a ground speed of the vehicle 20. The specific type and configuration of speed sensor 52 is not pertinent to the teachings of this disclosure, are known to those skilled in the art, and are therefore not described in detail herein.

The vehicle 20 includes the front differential hydraulic drive system 48 that is operable to drive the front left wheel 28 at a first rotational speed, and the front right wheel 26 at a second rotational speed. The second rotational speed may be different than the first rotational speed to turn the vehicle 20. When the front right wheel 26 and the front left wheel 28 are driven at the same rotational speed, i.e., the first rotational speed and the second rotational speed are equal, then the front differential hydraulic drive system 48 does not generate a steering effect on the vehicle 20.

The front differential hydraulic drive system 48 may include a left-side motor 54 coupled to the front left wheel 28, and a right-side motor 56 coupled to the front right wheel 26. In the exemplary embodiment shown and described herein, the left-side motor 54 and the right-side motor 56 may each include a hydraulic motor. The right-side motor 56 and the left-side motor 54 receive a flow of hydraulic fluid from a hydraulic drive fluid circuit 58, and generate torque to drive the front left wheel 28 and the front right wheel 26 respectively, as is known in the art. It should be appreciated that the front differential hydraulic drive system 48 may be configured differently than the exemplary embodiment described herein and shown in the Figures.

The vehicle 20 further includes a pump 60. The pump 60 is operable to circulate a hydraulic fluid. The pump 60 may be connected to and driven by a power source, such as but not limited to an internal combustion engine 62. The pump 60 may include a single pump, or multiple pumps. While the detailed description refers to the pump 60 singularly, and FIG. 2 shows only a single pump 60, it should be appreciated that the pump 60 may include more than one pump. For example, the pump 60 may include a first pump for driving the front left-side motor 54, a second pump for driving the front right-side motor 56, and a third pump for the rear steering system 50. It should be appreciated that the vehicle 20 may be equipped with other additional pumps for other systems and/or devices.

The vehicle 20 further includes a tank 64. The hydraulic drive fluid circuit 58 interconnects the pump 60 and the front differential hydraulic drive system 48. The tank 64 is disposed in fluid communication with the hydraulic drive fluid circuit 58 and the pump 60. As such, it should be appreciated that the pump 60 draws hydraulic fluid from the tank 64, circulates the hydraulic fluid through the hydraulic drive fluid circuit 58, the front differential hydraulic drive system 48, the rear steering system 50, potentially other systems of the vehicle 20, and back to the tank 64 to complete the fluid circuit. It should be appreciated that the various hydraulic components and/or hydraulic systems of the vehicle 20 may be connected through lines and/or conduits that are not show or depicted in the Figures, nor specifically described herein.

A first front drive control valve 66 is disposed in the hydraulic drive fluid circuit 58, between the pump 60 and the front differential hydraulic drive system 48. The first front drive control valve 66 is operable to output a defined fluid flow in response to the steering command input applied to the steering input device 36. In the exemplary embodiment shown in the Figures and described herein, the steering input device 36 is mechanically coupled to the first front drive control valve 66, and may be defined as, and/or referred to as, a manual steering control valve for enabling manual steering of the vehicle 20 by the operator. In other embodiments, the steering input device 36 may be electrically connected to the first front drive control valve 66, and may be defined as and/or referred to as an electronic steer-by-wire system. For example, the steering controller 40 may generate a front steering control signal from the signal from the steering sensor 38, and communicate the front steering control signal to the first front drive control valve 66. The first front drive control valve 66 may be configured in any suitable manner capable of executing the functions described herein, and may include a single valve or multiple valves combined to provide the functions described herein. Suitable valves for use as the first front drive control valve 66 are known to those skilled in the art. The specific type, construction, and operation of the first front drive control valve 66 are not pertinent to the teachings of this disclosure, are known to those skilled in the art, and are therefore not described in detail herein.

The defined fluid flow output from the first front drive control valve 66 may include a left-side component 68 and a right-side component 70. The left-side component 68 of the defined fluid flow output from the first front drive control valve 66 is disposed in fluid communication with the left-side motor 54 for driving the left-side motor 54. The right-side component 70 of the defined fluid flow output from the first front drive control valve 66 is disposed in fluid communication with the right-side motor 56 for driving the right-side motor 56. In the example embodiment, the steering control input from the steering control device 35 controls the first front drive control valve 66 to output the defined fluid flow to the hydraulic drive fluid circuit 58, including the left-side component 68 and the right-side component 70 of the defined fluid flow.

The vehicle 20 further includes a second front drive control valve 72, which is disposed in fluid communication with the tank 64. The second front drive control valve 72 is disposed in the hydraulic drive fluid circuit 58, between the first front drive control valve 66 and the front differential hydraulic drive system 48. The second front drive control valve 72 is operable to selectively divert a portion of the defined fluid flow output from the first front drive control valve 66. More specifically, the second front drive control valve 72 is selectively controllable to divert a portion of the defined fluid flow output from the first front drive control valve 66 to the tank 64, thereby reducing the amount of hydraulic fluid that is communicated to the front differential hydraulic drive system 48. The second front drive control valve 72 may be controlled to divert a substantially equal amount of fluid from each of the left-side component 68 and the right-side component 70 of the defined fluid flow. Alternatively, the second front drive control valve 72 may be controlled to divert varying amounts of the fluid from the left-side component 68 and the right-side component 70 of the defined fluid flow.

The second front drive control valve 72 may be configured in any suitable manner capable of executing the functions described herein, and may include a single valve or multiple valves combined to provide the functions described herein. Suitable valves for use as the second front drive control valve 72 are known to those skilled in the art. The specific type, construction, and operation of the second front drive control valve 72 are not pertinent to the teachings of this disclosure, are known to those skilled in the art, and are therefore not described in detail herein.

In the exemplary embodiment of the vehicle 20 shown in the Figures and described herein, the second front drive control valve 72 may be defined as, and/or referred to as, an autonomous steering control valve that is controlled by the steering controller 40 for enabling autonomous steering of the vehicle 20 without active operator steering input. When steering of the vehicle 20 is being controlled autonomously, the steering controller 40 uses the second front drive control valve 72 to communicate hydraulic fluid to the front differential hydraulic drive system 48, whereas when the steering of the vehicle 20 is being controlled manually by the operator, the steering controller 40 uses the first front drive control valve 66 to communicate the hydraulic fluid to the front differential hydraulic drive system 48. When the steering of the vehicle 20 is controlled manually by the operator, the second front drive control valve 72 may be turned off, or alternatively, may be controlled to divert a portion of the hydraulic fluid in the hydraulic drive fluid circuit 58 to tank 64, as described in greater detail below.

As noted above, the rear left wheel 32 and a rear right wheel 30 may be steerable wheels that are rotatable about respective vertical axes. Accordingly, the vehicle 20 may include the rear steering system 50 operable to control or steer the rear right wheel 30 and the rear left wheel 32 for turning the vehicle 20. The rear steer system may include a system capable of controlling the direction or angle or rotation of the rear right wheel 30 and the rear left wheel 32 about their respective vertical axes. The exemplary embodiment of the vehicle 20 includes the rear right wheel 30 and the rear left wheel 32 as caster mounted wheels. However, it should be appreciated that the rear left wheel 32 and the rear right wheel 30 may be mounted to the frame in some other manner not specifically described or shown herein.

In the exemplary embodiment of the vehicle 20 shown and described herein, the rear steering system 50 is a hydraulically controlled steering system. The rear steering system 50 includes at least one rear steering control valve 74 and at least one rear hydraulic cylinder 76A, 76B. As shown in FIG. 2, the vehicle 20 includes a right rear hydraulic cylinder 76A for controlling rotation of rear right wheel 30, and a left rear hydraulic cylinder 76B for controlling rotation of the rear left wheel 32. The left rear hydraulic cylinder 76B and the right rear hydraulic cylinder 76A may be plumbed in series as is known in the art. The rear steering control valve 74 is disposed in fluid communication with the pump 60 for receiving hydraulic fluid therefrom. The rear steering control valve 74 is also in fluid communication with the rear hydraulic cylinders 76A, 76B. As noted above, the steering controller 40 is operable to generate and communicate the rear steering control signal 82 to the rear steering system 50, based on the sensor signal. The rear steering control valve 74 is operable to output a rear fluid flow in response to a rear steering control signal 82 from the steering controller 40 (described in greater detail below). The rear fluid flow is communicated to the rear hydraulic cylinders 76A, 76B to actuate the rear hydraulic cylinders 76A, 76B, which in turn rotate the rear left wheel 32 and the rear right wheel 30 about their respective vertical axis for turning the vehicle 20.

As noted above, the processor 42 is operable to execute the steering authority control algorithm 46 to implement the method of controlling the front differential hydraulic drive system 48 and the rear steering system 50. The steering controller 40 may implement the method when the vehicle 20 is operating in a pre-defined condition, and/or when a current vehicle operating characteristic satisfies the pre-defined condition.

As noted above, the vehicle 20 uses the front differential hydraulic drive system 48 to steer the front wheels. This configuration may be difficult to steer at higher speeds, due to the sensitivity and response time from the front differential hydraulic drive system 48 for a steering command input. Accordingly, in certain situations, it may be advantageous to reduce the steering control or authority provided by the front wheels 26, 28 by the front differential hydraulic drive system 48, and rely more on the rear steering system 50 to provide the steering control of the vehicle 20.

The steering authority control algorithm 46 determines if the vehicle 20 is currently operating in one or more pre-defined conditions. In other words, the steering authority control algorithm 46 determines if a current vehicle operating characteristic satisfies the pre-defined condition, or if the current vehicle operating characteristic does not satisfy the pre-defined condition. For example, the current vehicle operating characteristic may include one of either autonomous steering control of the vehicle 20 by the steering controller 40, or manual steering control of the vehicle 20 by an operator. The pre-defined condition may be defined to include actively using manual steering control of the vehicle 20 by the operator. Accordingly, the steering authority control algorithm 46 determines if the vehicle 20 is being controlled using manual steering by the operator, or if the vehicle 20 is being controlled using autonomous steering by the steering controller 40. The steering authority control algorithm 46 may make this determination based on controls engaged by the operator. For example, if the operator has engaged an autonomous operation system, then the steering authority control algorithm 46 may determine that the vehicle 20 is being controlled autonomously, whereas if the steering sensor 38 detects a steering command input, the steering authority control algorithm 46 may determine that the vehicle 20 is being controlled manually. If the vehicle 20 is currently being controlled using autonomous steering by the steering controller 40, then the current operating characteristic does not satisfy the pre-defined condition, and the method or process described herein is not implemented. However, if the vehicle 20 is currently being controlled using manual steering by the operator, then the steering authority control algorithm 46 may implement the process described herein.

When the steering authority control algorithm 46 determines that the vehicle 20 is currently be controlled by manual steering by the operator, the steering authority control algorithm 46 may then proceed to determine if other pre-defined conditions are satisfied, i.e., if another current vehicle operating characteristic satisfies another pre-defined condition. For example, the current vehicle operating characteristic may be defined as a current speed of the vehicle 20, and the pre-defined condition may be defined to include the current speed of the vehicle 20 being equal to or greater than a minimum pre-defined speed. The minimum pre-defined speed, may be defined, for example, to equal 10 mph. As noted above, the vehicle 20 includes the speed sensor 52, which is disposed in communication with the steering controller 40 for communicating a signal indicative of the ground speed of the vehicle 20. The steering authority control algorithm 46 may use the data from the speed sensor 52 to determine if the current speed of the vehicle 20 is less than a minimum pre-defined speed, or if the current speed of the vehicle 20 is equal to or greater than the minimum pre-defined speed. If the current speed of the vehicle 20 is less than the minimum pre-defined speed, the steering authority control algorithm 46 may determine that the pre-defined condition is not satisfied, and the process described herein is not implemented. However, if the speed of the vehicle 20 is equal to or greater than the minimum pre-defined speed, then the steering authority control algorithm 46 may determine that the pre-defined condition is satisfied, and may implement the process described herein.

It should be appreciated that the current vehicle operating characteristic and the pre-defined condition may be defined to include other parameters than described herein, and that the scope of the disclosure is not limited to only the exemplary embodiments of manual steering by the operator and/or a speed of the vehicle 20. Other parameters that may be considered include but are not limited to operation of the vehicle 20 on a roadway, current operation/engagement of an implement, e.g., the header 22, etc.

If the steering authority control algorithm 46 determines that the pre-defined condition is satisfied, then the steering authority control algorithm 46 proceeds with the process, and controls the second front drive control valve 72 to divert a portion of the defined fluid flow output from the first front drive control valve 66 to define a reduced fluid flow. The reduced fluid flow is communicated to the front differential hydraulic drive system 48 via the hydraulic drive fluid circuit 58, thereby reducing or desensitizing the steering response from the front differential hydraulic drive system 48 for the given steering command input. By reducing or desensitizing the steering response from the front differential hydraulic drive system 48 for the steering command input, a steering ratio of the front differential hydraulic drive system 48 relative to the rear steering system 50 for the steering command input is reduced. As used herein, the term "steering ratio" is defined as a difference in rotational speed between the front left wheel 28 and the front right wheel 26, relative to the degree of rotation of the rear left wheel 32 and the rear right wheel 30 about their respective vertical axes.

Accordingly, in the exemplary embodiment described herein, when the vehicle 20 is operating in a manual steering mode in which the operator is controlling and/or providing the steering command inputs via the steering input device 36, and the speed of the vehicle 20 is greater than the minimum pre-defined speed, the steering authority control algorithm 46 implements the process described herein to divert a portion of the fluid flow communicated to the front differential hydraulic drive system 48 to the tank 64 in order to desensitize or reduce the steering response provided from the front differential hydraulic drive system 48 for the given steering command input.

For example, the operator may enter a steering command input into the steering input device 36. The steering sensor 38 senses the steering command input, and communicates the sensor signal to the steering controller 40 indicating the steering command input. The steering controller 40 generates the rear steering control signal 82 for the steering command input. The first front drive control valve 66 outputs the defined fluid flow in response to the steering command input. If all pre-defined conditions are satisfied, such as manual steering control and/or the speed of the vehicle 20, the steering controller 40 generates and communicates a bleed control signal 84 to the second front drive control valve 72. The bleed control signal 84 controls the second front drive control valve 72 to divert a portion of the defined fluid flow that was output from the first front drive control valve 66 to the tank 64, thereby reducing the fluid flow in the hydraulic drive fluid circuit 58 that is communicated to the front differential hydraulic drive system 48, which reduces the steering output from the front differential hydraulic drive system 48. The rear steering system 50 is not affected by the diversion of the fluid in the hydraulic drive fluid circuit 58. As such, the steering controller 40 generates and communicates the rear steering control signal 82 to the rear steering control valve 74, which in turn outputs the rear fluid flow to the rear hydraulic cylinders 76A, 76B to turn the rear left wheel 32 and the rear right wheel 30 respectively. The rear steering system 50 provides the same steering response for the steering command input regardless of how the front differential hydraulic drive system 48 is controlled. Accordingly, because the steering control from the front differential hydraulic drive system 48 is reduced while the steering control from the rear steering system 50 remains the same for the given steering command input, the effect of this process is to reduce the steering ratio between the front differential hydraulic drive system 48 and the rear steering system 50, such that the rear steering system 50 provides more of the steering control for the vehicle 20. Using the rear steering system 50 to provide more steering control or authority for the vehicle 20 increases handling and control of the vehicle 20 when operating in the pre-defined conditions.

The steering authority control algorithm 46 may further control the second front drive control valve 72 to control a volume or an amount of fluid diverted from the hydraulic drive fluid circuit 58, based on a magnitude of the current vehicle operating characteristic and/or some other parameter. For example, the steering authority control algorithm 46 may modulate or adjust the bleed control signal 84 to control an amount of fluid diverted by the second front drive control valve 72 based on the speed of the vehicle 20. Accordingly, as the magnitude of the current vehicle operating characteristic increases, e.g., the speed of the vehicle 20 increases, the amount of fluid diverted by the second front drive control valve 72 increases. It should be appreciated that the amount of fluid diverted by the second front drive control valve 72 may be adjusted and/or controlled based on some other factor or parameter other than the speed of the vehicle 20, and that the amount of fluid diverted is dependent upon the specific vehicle 20 application and operating conditions.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A vehicle comprising:
a steering control system operable to receive a steering command input from an operator;
a rear steering system having at least one rear wheel rotatable about a respective vertical axis a predetermined angle to turn the vehicle in response to the steering command input from the operator;
a front differential hydraulic drive system operable to drive a front left wheel at a first rotational speed and a front right wheel at a second rotational speed that is different than the first rotational speed to turn the vehicle in response to the steering command input from the operator;
a pump operable to circulate a hydraulic fluid;
a hydraulic drive fluid circuit interconnecting the pump and the front differential hydraulic drive system;
a first front drive control valve disposed in the hydraulic drive fluid circuit and operable to output a defined fluid flow in response to the steering command input;
a second front drive control valve disposed in the hydraulic drive fluid circuit between the first front drive control valve and the front differential hydraulic drive system, wherein the second front drive control valve is operable to selectively divert a portion of the defined fluid flow output from the first front drive control valve;
a steering controller including a processor and a memory having a steering authority control algorithm stored thereon, wherein the processor is operable to execute the steering authority control algorithm to:
control the second front drive control valve to divert a portion of the defined fluid flow output from the first front drive control valve to define a reduced fluid flow that is communicated to the front differential hydraulic drive system, such that a steering ratio of the front differential hydraulic drive system relative to the rear steering system for the steering command input is reduced.

2. The vehicle set forth in claim 1, wherein the steering control system includes a steering input device operable to receive the steering command input.

3. The vehicle set forth in claim 2, wherein the steering control system includes a steering sensor coupled to the steering input device and operable to detect the steering command input and output a sensor signal indicative of the steering command input.

4. The vehicle set forth in claim 3, wherein the steering controller is in communication with the steering sensor for receiving the signal, and wherein the steering controller is operable to communicate a rear steering control signal to the rear steering system, based on the sensor signal, for controlling rotation of the at least one rear wheel about its respective vertical axis the predetermined angle.

5. The vehicle set forth in claim 1, wherein the front differential hydraulic drive system includes a left-side motor coupled to the front left wheel, and a right-side motor coupled to the front right wheel, and wherein the defined fluid flow output form the first front drive control valve includes a left-side component in fluid communication with the left-side motor for driving the left-side motor, and a right-side component in fluid communication with the left-side motor for driving the left-side motor.

6. The vehicle set forth in claim 5, wherein the second front drive control valve is operable to divert a substantially equal amount of fluid from each of the left-side component and the right-side component of the defined fluid flow.

7. The vehicle set forth in claim 1, wherein the hydraulic drive fluid circuit includes a tank in fluid communication with the second front drive control valve, and wherein the second front drive control valve is selectively controllable to divert a portion of the defined fluid flow to the tank.

8. The vehicle set forth in claim 1, wherein the first front drive control valve is a manual steering control valve for enabling manual steering of the vehicle, and the second front drive control valve is an autonomous steering control valve controlled by the steering controller for enabling autonomous steering of the vehicle without operator input.

9. The vehicle set forth in claim 8, wherein the processor is operable to execute the steering authority control algorithm when a current vehicle operating characteristic satisfies a pre-defined condition, wherein the current vehicle operating characteristic includes one of either automatic steering control of the vehicle by the steering controller or manual steering control of the vehicle by an operator, and wherein the pre-defined condition includes actively using manual steering control of the vehicle by the operator.

10. The vehicle set forth in claim 9, wherein the processor is operable to execute the steering authority control algorithm to determine if the current vehicle operating characteristic satisfies the pre-defined condition, or if the current vehicle operating characteristic does not satisfy the pre-defined condition.

11. The vehicle set forth in claim 10, wherein the current vehicle operating characteristic is a current speed of the vehicle, the pre-defined condition is the current speed of the vehicle being equal to or greater than a minimum pre-defined speed, and wherein the vehicle includes a speed sensor operable to sense a speed of the vehicle and communicate the sensed speed to the steering controller, whereby the processor is operable to execute the steering authority control algorithm to determine if the current speed of the vehicle is less than the minimum pre-defined speed, or if the current speed of the vehicle is equal to or greater than the minimum pre-defined speed.

12. The vehicle set forth in claim 1, wherein the processor is operable to execute the steering authority control algorithm to control an amount of fluid diverted by the second front drive control valve based on a magnitude of the current vehicle operating characteristic.

13. The vehicle set forth in claim 12, wherein the processor is operable to execute the steering authority control algorithm to control an amount of fluid diverted by the second front drive control valve such that as the magnitude of the current vehicle operating characteristic increases, the amount of fluid diverted by the second front drive control valve increases.

14. The vehicle set forth in claim 1, wherein the rear steering system is a hydraulically controlled steering system.

15. A vehicle comprising:
a front differential hydraulic drive system operable to drive a front left wheel at a first rotational speed and a front right wheel at a second rotational speed that is different than the first rotational speed to turn the vehicle;
a pump operable to circulate a hydraulic fluid;
a hydraulic drive fluid circuit interconnecting the pump and the front differential hydraulic drive system;
a first front drive control valve disposed in the hydraulic drive fluid circuit and operable to output a defined fluid flow in response to a steering command input;
a second front drive control valve disposed in the hydraulic drive fluid circuit between the first front drive control valve and the front differential hydraulic drive system, wherein the second front drive control valve is operable to selectively divert a portion of the defined fluid flow output from the first front drive control valve; and
a steering controller including a processor and a memory having a steering authority control algorithm stored thereon, wherein the processor is operable to execute the steering authority control algorithm to:
control the second front drive control valve to divert a portion of the defined fluid flow output from the first front drive control valve to define a reduced fluid flow that is communicated to the front differential hydraulic drive system to desensitize a steering response from the front differential hydraulic drive system.

16. The vehicle set forth in claim 15, further comprising a hydraulically controlled rear steering system having at least one rear wheel rotatable about a respective vertical axis a predetermined angle to turn the vehicle in response to the steering command input, such that controlling the second front drive control valve to divert the portion of the defined fluid flow output from the first front drive control valve reduces a steering ratio of the front differential hydraulic drive system relative to the rear steering system for the steering control signal.

17. The vehicle set forth in claim 15, wherein the front differential hydraulic drive system includes a left-side motor coupled to the front left wheel, and a right-side motor coupled to the front right wheel, and wherein the defined fluid flow output form the first front drive control valve includes a left-side component in fluid communication with the left-side motor for driving the left-side motor, and a right-side component in fluid communication with the left-side motor for driving the left-side motor.

18. The vehicle set forth in claim 17, wherein the second front drive control valve is operable to divert a substantially equal amount of fluid from each of the left-side component and the right-side component of the defined fluid flow.

19. The vehicle set forth in claim 15, wherein the processor is operable to execute the steering authority control algorithm to control an amount of fluid diverted by the second front drive control valve based on a magnitude of a current vehicle operating characteristic.

20. The vehicle set forth in claim 19, wherein the processor is operable to execute the steering authority control algorithm to control an amount of fluid diverted by the second front drive control valve such that as the magnitude of the current vehicle operating characteristic increases, the amount of fluid diverted by the second front drive control valve increases.

* * * * *